United States Patent [19]

Viscome et al.

[11] Patent Number: 4,813,722
[45] Date of Patent: Mar. 21, 1989

[54] LOCKING DEVICE FOR VEHICLE FOLD-DOWN SEAT BACKREST

[75] Inventors: Dennis M. Viscome, Taylor; Wilbur E. Schwartz, Dearborn Heights, both of Mich.

[73] Assignee: Chrysler Motors Corporation, Highland Park, Mich.

[21] Appl. No.: 110,395

[22] Filed: Oct. 20, 1987

[51] Int. Cl.$^4$ .............................................. E05C 3/26
[52] U.S. Cl. ...................................... 292/216; 70/211; 70/224; 70/484; 292/DIG. 31; 296/63
[58] Field of Search ............ 292/216, 336.3, DIG. 31; 70/211, 224, 484; 296/63

[56] References Cited

U.S. PATENT DOCUMENTS

| | | | |
|---|---|---|---|
| 4,438,964 | 3/1984 | Peters | 292/216 |
| 4,637,648 | 1/1987 | Okino et al. | 292/227 X |
| 4,671,548 | 6/1987 | Häberle et al. | 292/216 |
| 4,684,175 | 8/1987 | Trutter | 292/227 X |

*Primary Examiner*—Richard E. Moore
*Attorney, Agent, or Firm*—Edward P. Barthel

[57] ABSTRACT

An improved locking device for a latching and locking mechanism wherein upon a motor vehicle rear seatback being unlocked it adapted to be unlatched for swinging to a fold-down position by pivoting a handle portion of an operating lever providing pass through access between the vehicle passenger compartment and rear storage trunk. The locking device provides a key locking cylinder which in its locked mode has a lock bar biased in one direction such that its one end contacts a cam segment on the cylinder. The lock bar is formed with a pair of notches spaced on centers equal to the spacing between support webs of a pivoting operating lever. The notches are positioned to block the pivoting of the lever in the cylinder locked mode by being misaligned with the support webs. Upon the lock bar being shifted by the cam segment, as a result of the cylinder being rotated by the key, the notches are aligned with the support webs allowing latch tripping movement of the operating lever probe to free the striker allowing the backrest to be swung to its fold-down unlatched position.

5 Claims, 5 Drawing Sheets

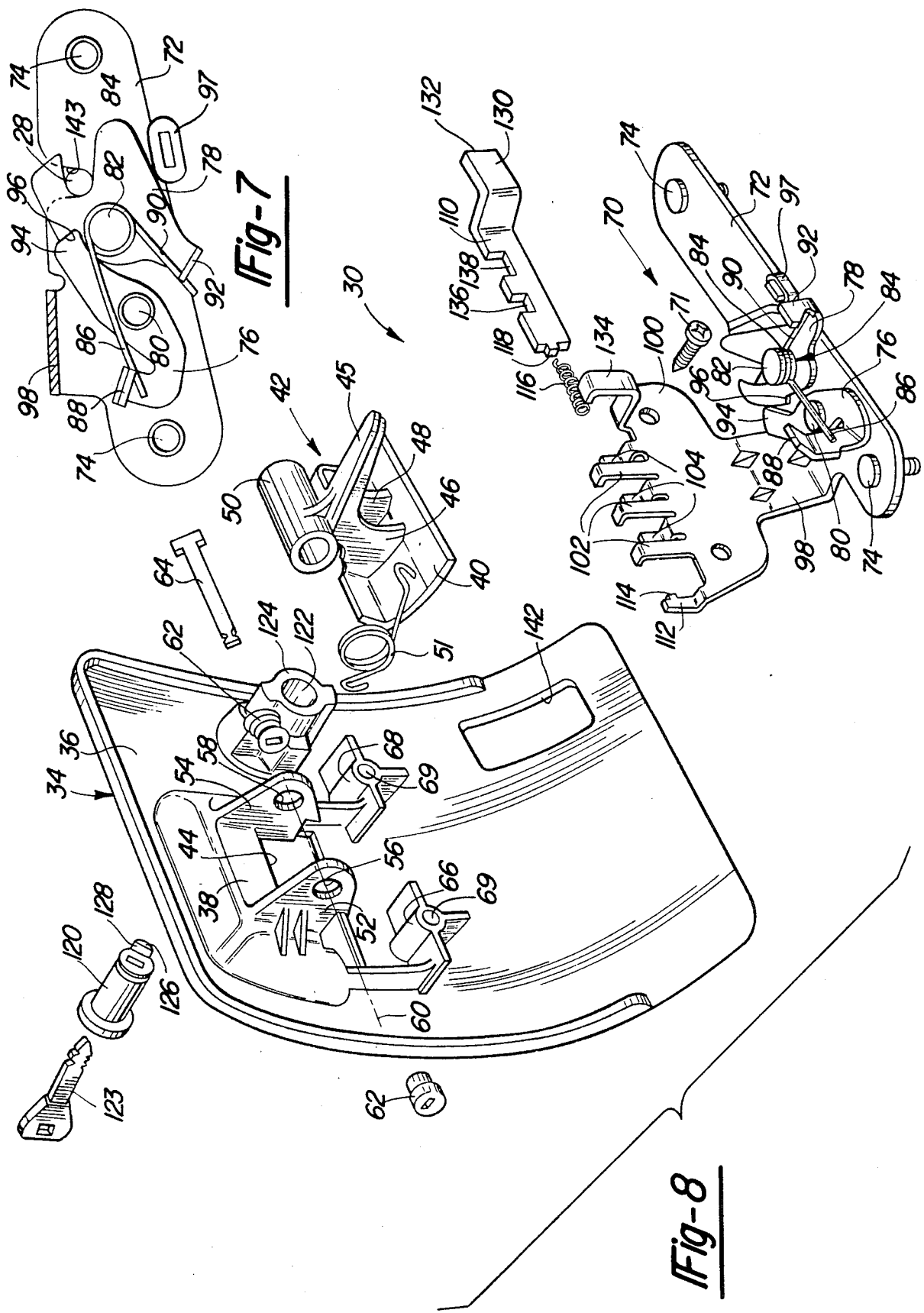

LOCKING DEVICE FOR VEHICLE FOLD-DOWN SEAT BACKREST

BACKGROUND OF THE INVENTION

The present invention relates to devices for releasably securing pivoting seat backs in vehicles so that the seat back is normally held in an upright seating position but may be released for forward pivotal movement to permit access to the rear pass-through cargo storage compartment of the vehicle. The prior art locking devices, of which the present invention is an improvement thereover, presented a problem wherein the device could be overridden if the release handle was subjected to sufficient user force.

The U.S. Pat. No. 4,637,648 issued Jan. 20, 1987 to Okino et al. is an example of rear seat back locking arrangement, in which in a motor vehicle is adapted to communicate its passenger compartment with its trunk when a rear seat back is pivoted downwardly into its fold-down position. The Okino et al. patent provides one type of key cylinder locking arrangement such that when the key cylinder is operated for locking, with the seat back held in its erected state, the seat back cannot be released from the locked state.

The U.S. Pat. No. 4,684,175 issued Aug. 4, 1987 to Trutter discloses a locking device for a rear seat back rest including a tongue-shaped locking member which is fastened to a body compartment and provided with a recess. The Trutter locking device includes a plastic housing built into the seat back. The housing accommodates a single-arm latch bar which is adapted to engage into the recess of the tongue-like locking member by way of a latch tab.

SUMMARY OF THE PRESENT INVENTION

It is an object of the present invention to provide an improved automotive backrest locking device that will be easy to operate, simple and inexpensive in design requiring minimal revision of the prior art locking device. The device comprises a rotatable, key operated lock cylinder which is formed with a cam segment on its inner end. The cam segment is operative, upon rotation of the cylinder, to rotatably engage one end of a lock bar causing it to be shifted transversely to the axis of the lock cylinder. In its locked mode the lock bar's opposite end is biased by a return spring to extend past the cylinder's rotational axis into abutting contact with a vertically disposed face of the cam segment. With the lock bar urged in its locked spring biased mode, the locking device operating handle cannot be pivoted. Upon the cam segment being rotated by the locking cylinder substantially ninety degrees, the lock bar is shifted a predetermined distance to its disengaged unlocked mode against its return spring bias. In the lock bar's unlocked mode the operating handle may be pivoted by the user against the resilient urging of a torsion spring tripping a latch mechanism and releasing a striker on the backrest. As a result, the backrest is free to be rotated downwardly into its backrest fold-down unlatched position.

The lock bar is formed with a pair of notches in its upper edge the centers of which are spaced a predetermined distance. Upon the bar being shifted the predetermined distance against its return spring bias to its disengaged mode, the notches are adapted to receive therein associated web portions formed on the operating handle allowing the handle to pivot and trip the latch mechanism. With the lock bar in its locked mode, the notches are located in web portion unaligned positions shifted to their unaligned positions thereby positively blocking any pivotal movement of the operating handle.

It is another object of the present invention to provide an improved automotive seat back locking device as set forth above wherein the shifting lock bar is supported on the plate bracket portion by guideway means formed by first and second offset spaced sets of fingers lanced from the free edge thereof.

These and other objects, features and advantages of the invention will be apparent from the accompanying drawings and from the detailed description of the preferred embodiment of the invention.

BRIEF DESCRIPTION OF THE DRAWINGS

A preferred embodiment of the invention is illustrated in the in which:

FIG. 7 is a fragmentary sectional view taken substantially on the line 7—7 of FIG. 3; and FIG. 8 is an exploded perspective view of the improved locking device of the present invention together with the seatback latching mechanism.

DETAILED DESCRIPTION OF THE INVENTION

Figure 1:
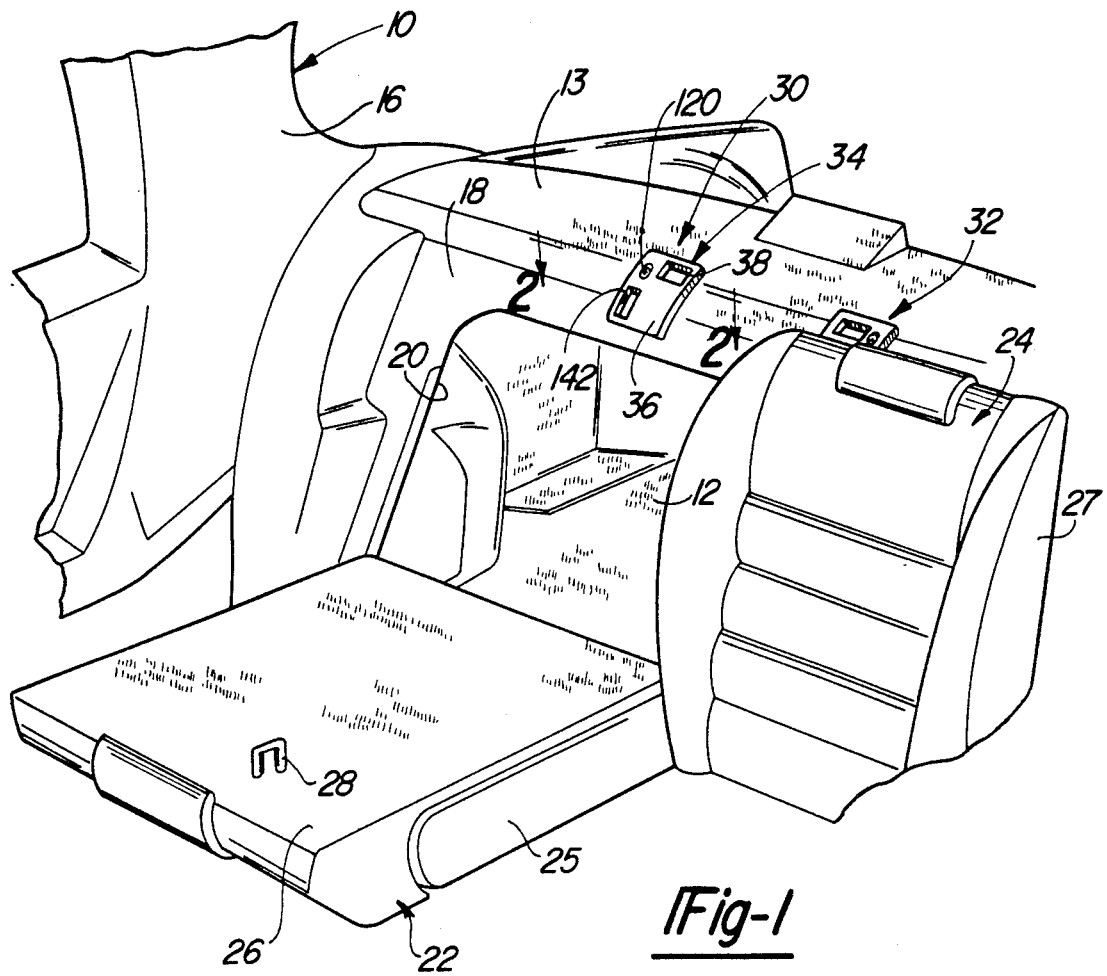
FIG. 1 is a partial perspective view of a vehicle having a rear seat including a pair of forwardly tilting seat backrests pivotally mounted thereon including an improved locking device according to this invention with the passenger side backrest shown in its forwardly tilted unlatched position and the driver side backrest shown in its latched seating position.

Referring now particularly to FIG. 1 of the drawings, a vehicle 10 includes a floor pan 12 and an upper rear window shelf 13 partially defining therebetween a rear pass-through storage compartment 14. The vehicle passenger compartment, including side wall 16, is separated from the rear storage compartment 14 by a bulkhead 18 having a rectangular shaped access opening 20 formed therein. The access opening 20 is closed by a pair of rear seat backrests or seat backs 22 and 24 of unequal widths positioned in side-by-side relation. The passenger side backrest 22 is illustrated in its unlatched fold-down mode while the driver side backrest 24 is shown in its latched upright seating position. With the backrest 22 folded down its rear facing back panel 26 forms a generally horizontal loading surface.

Suitable inboard pivot shafts (not shown) extend transversely from each inboard sidewall 25 and pivotally mount to a center bracket (not shown). Outboard pivot shafts (not shown) pivotally mount the outboard side walls 27 of the backrest to the associated vehicle body interior wall 16. While the backrests 22 and 24 are normally latched in their upright positions against bulkhead 18, it is possible for one or both of the backrests to be located in their fold-down unlatched position during normal use of the vehicle wherein extra long cargo may extend between the rear cargo area 14 and the passenger cabin via the pass-through access openings 20.

The present invention concerns an improved locking device for securing each backrest in its upright latched position as seen by the backrest 24 in FIG. 1. Each backrest rear facing back panel 26 has a U-shaped striker 28 suitably affixed thereto operative to latchingly engage its associated latching and locking mechanism generally indicated at 30 in FIG. 1. The mechanism 30 is mounted in a cavity 31 located at the juncture of the shelf 13 and the bulkhead 18 positioned above the access opening 20. It will be noted that a mirror image mechanism 32 is provided for the driver side backrest 24. As the latching and locking mechanisms 30 and 32 are identical in structure and operation only the passenger side mechanism 30 will be described in detail.

Figure 3:
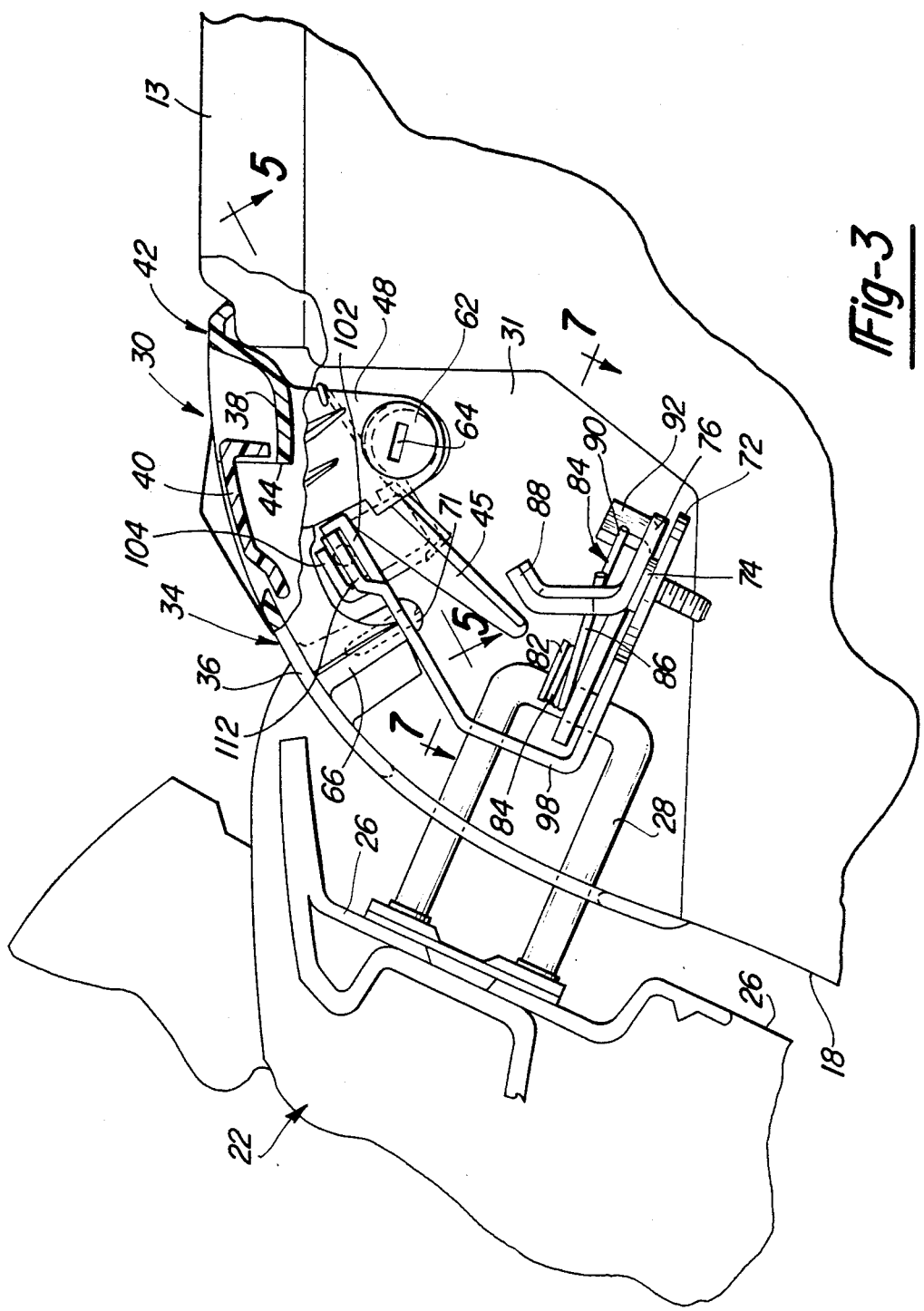
FIG. 3 is a fragmentary enlarged vertical sectional view of the locking device of FIG. 1 shown with the passenger side backrest locked in its upright latched seating position.

As best seen in FIGS. 3 and 8, the mechanism 30 comprises a plastic support casing, generally indicated at 34, including an outwardly curved face plate portion 6. The face plate portion 36 is formed with a rectangular shaped depressed handle recess 38 in which a handle portion 40 of an operating lever, generally indicated at 42, is installed and into which recess the user reaches to unlatch the device. In the handle recess 38, there is formed an opening 44 through which a lever arm probe portion 45 is passed. It will be noted in FIG. 8 that the lever arm probe 45 has its one end integrally molded to a pair of first and second parallel support rib portions or webs 4 and 48, respectively. The webs 46 and 48 also integrally interconnect the handle portion 40 with a cylindrical pivot bushing 50 having its principal axis extending transversely to the lever arm probe 45.

A coil tension spring 51 encircles the bushing 50 with its hooked ends restrained at opposite ends on the lever arm probe 45 and a pivot support trunnion 52. The spring 51 urges or biases the operating lever 42 in a clockwise direction, as viewed in FIGS. 3 and 4, to thereby resiliently urge the handle portion 40 to its normal outer spring biased position shown in FIG. 3. FIG. 8 shows the inner face of the recess 38 formed with a pair of pivot support trunnions 52 and 54 extending normally therefrom. The parallel disposed trunnions 52 and 54 have aligned holes 56 and 58, the centers of which define a pivot axis 60 of the operating lever 42. As best seen in FIG. 8 the operating lever bushing 50 is adapted to be located between the trunnions 52 and 54 and is pivotally mounted thereto by pair of pivot dowels 62 received in their associated trunnion holes 56, 58 and retained by a through connecting rod 64.

A pair of bosses 66 and 68 are formed on the inner surface of the face plate portion 36 providing bores 69 for mounting a latch assembly 70 thereto by means of threaded screws 71. The latch assembly includes a latch plate 72 having spaced holes through which extend threaded bolts 74 adapted to be threadably received in suitable mounting holes (not shown) in the cavity 31. The latch plate 72 rotatably mounts a pawl element 76 and a ratchet element 78 by means of their pivot pins 80 and 82, respectively, for swinging movement into and out of latched position. A sear wire spring 84 is coiled around pin 82 and its one end 86 contacts pawl lug 88 while its other end 90 engages ratchet lug 92. Thus, that pivoting of the pawl 88 counter clockwise and pivoting of the ratchet 92 clockwise winds the spring 84 wherein the pawl tooth 94 engages the ratchet notch 96 cocking the latch assembly. A rubber stop 97 is provided on the latch plate 72 to engage the ratchet element 78 upon it being tripped to its FIG. 7 position.

The latching plate portion 72 is integrally joined by a neck portion 98 to a locking plate bracket portion 100, the upper edge of which is formed with a plurality of integral finger means extending upwardly therefrom. The finger means comprise a first set of three equally spaced fingers 102 located in a first common plane that includes the locking plate bracket 100. A second set of three equally spaced fingers 104, alternately interspersed between the first set of fingers 102, are shown located in a second plane parallel to and offset a predetermined distance from the first set of fingers. The first 102 and second 104 alternating sets of fingers define guideway means in the form of transversely extending channel therebetween sized to slidably receive a rectangular sectioned lock bar 110 therein for transverse shifting motion.

As seen in FIGS. 3 and 8, the bracket portion 100 is also formed with an end finger 112 located in a third plane parallel to and intermediate the planes defined by the first 102 and second 104 sets of fingers. The end finger 112 has a tang 114 on its inner edge adapted to extend into one end coil return spring means in the form of a compression coil spring 116. FIG. 8 shows the lock bar 110 one end formed with a tang 118 in mutually opposed relation to tang 114 and adapted to extend into the other end coil of the compression spring 116. Thus, the spring 116 is retained in alignment with the principal shift axis of the lock bar 110 so as to bias the lock bar 110 in a first rightward direction toward a key operated locking cylinder shown at 120 in FIGS. 5, 6, and 8.

Figure 2:
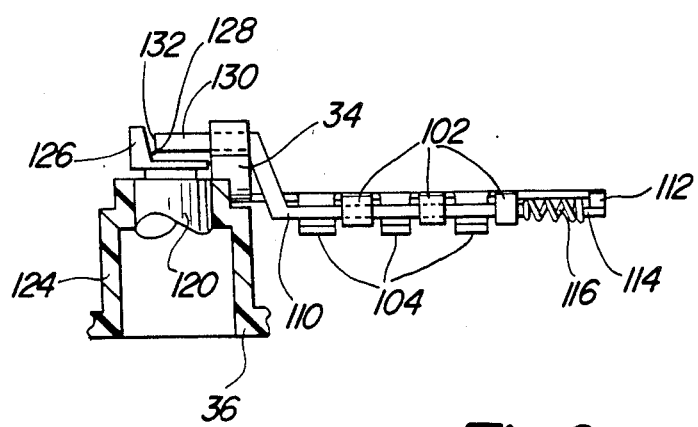
FIG. 2 is a fragmentary enlarged horizontal sectional view of the locking device in its spring biased locked position.
Figure 5:
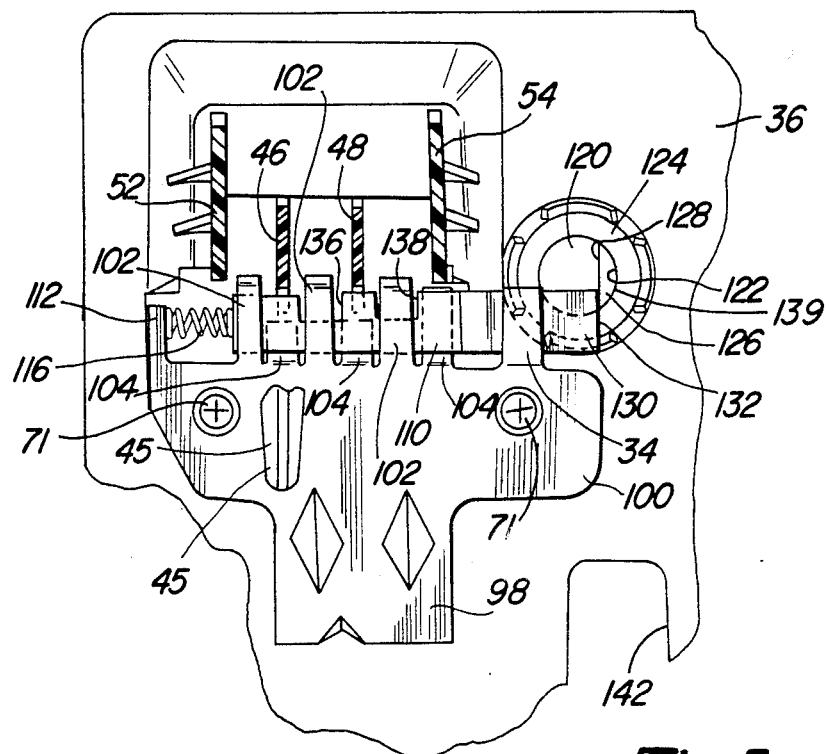
FIG. 5 is a diagonal fragmentary sectional view taken substantially on the line 5—5 of FIG. 3.

With reference to FIGS. 2 and 3 it will be seen that the locking cylinder is mounted in bore 122 of a locking cylinder boss 124 integrally formed on the inner surface of the face plate portion 36. The locking cylinder 120 is rotatably mounted in the bore 122 for movement between locked and unlocked position by a key 123 (FIG. 8). The locking cylinder inner end has an arcuate camming segment 126 extending axially therefrom including a tangent face 128. As best shown in FIG. 8, the lock bar 110 other or righthand end is formed with an L-shaped offset follower portion 130 the end edge 132 of which is adapted to engage the cam segment tangent face 12 as seen in FIG. 5. It will be noted that the locking 100 upper edge opposite righthand end is formed with an inwardly offset right angled finger 134 spaced the locking plate 100 and adapted to slidably the motion of the lock bar 110 offset follower portion 130.

Figure 6:
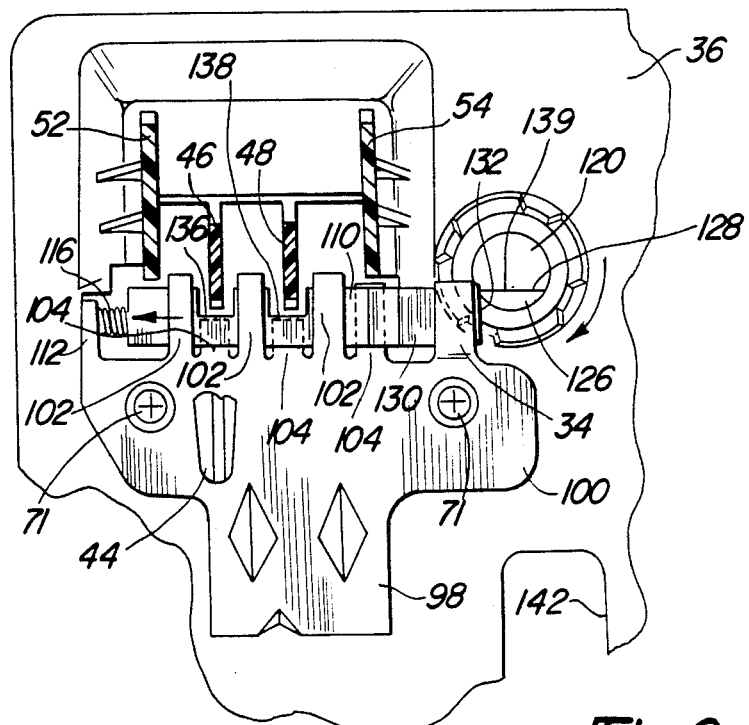
FIG. 6 is a diagonal fragmentary sectional view taken substantially on the line 6—6 of FIG. 4.

FIG. 5 shows the lock bar 110 upper edge formed a pair of first and second notches 136 and 138, re As seen in FIG. 6, the notches 136 and 138 their centers spaced a predetermined to the spacing of the first and second lever webs 46 and 48. Thus, with the key cylinder 120 rotated in a first clockwise direction, as viewed in FIG. 5, the camming segment 126 is revolved substantially 90 degrees from its position of FIG. 5 resulting in its lower knife edge 139 riding against the follower portion end edge 132. The locking cylinder clockwise movement causes the lock bar 110 to be moved or shifted leftward to its FIG. 6 position compressing the return spring 116 until the notches 136 and 138 are positioned with their centers in alignment with their associated webs 46 and 48.

Figure 4:
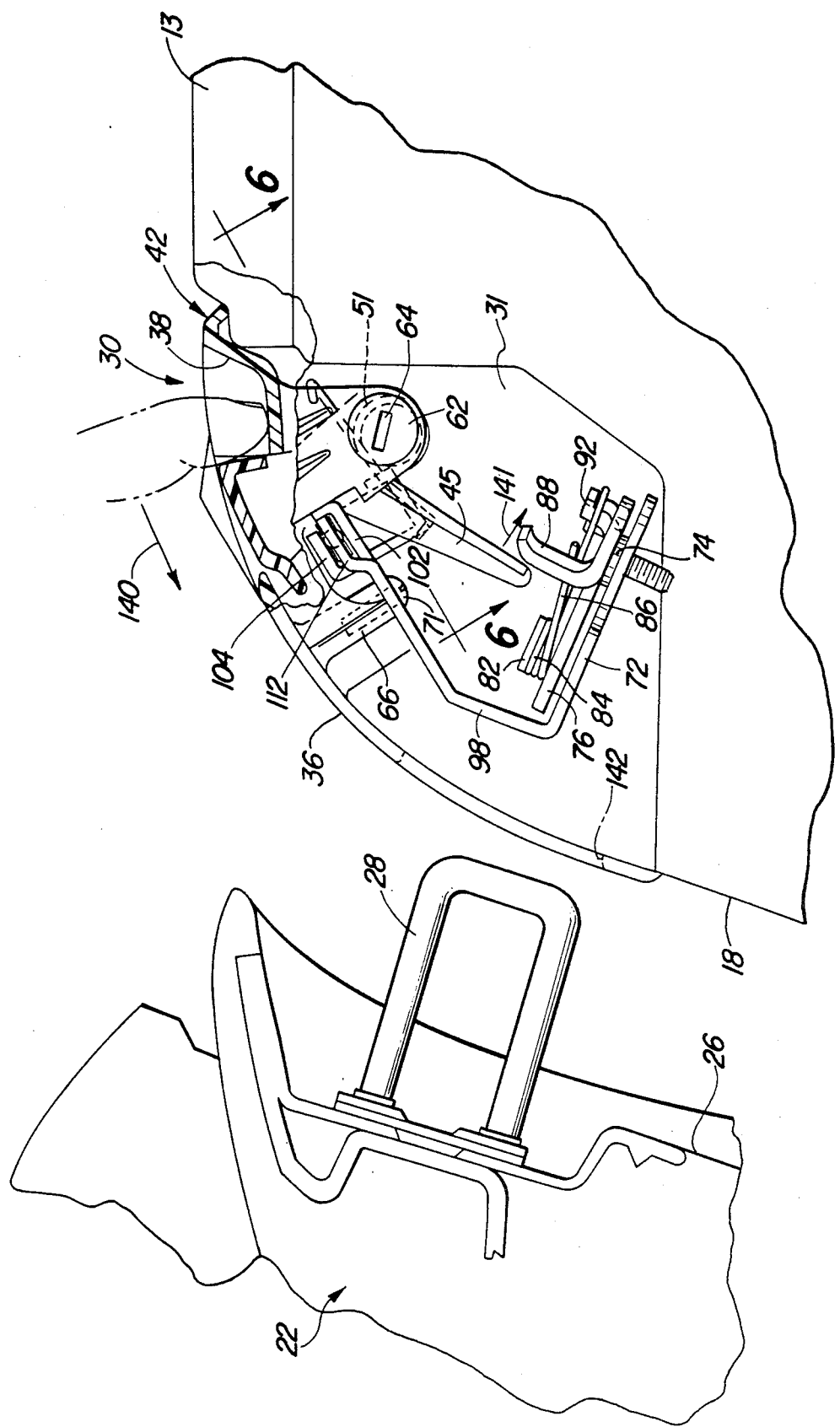
FIG. 4 is a view similar to FIG. 3 showing the locking device in its unlocked mode and the passenger side seat back partially pivoted towards its fold-down unlatched position.

In operation, upon the user's fingers pushing in the direction of arrow 140 in FIG. 4 the operating lever 42 is rotated about pivot axis 60 causing the lever arm probe 45 to pivot in the direction of arrow 141 and contact the pawl lug 88. As a result FIG. 7 indicates that the pawl 76 is rotated counterclockwise and its tooth 94 rides out of ratchet notch 96 tripping the latch mechanism. The force of spring 84 pivots the ratchet lug 78 in a counterclockwise unlocking direction contacting rubber stop 97 and urging the striker 28 out of striker admission slot 143 formed in the latch plate 72. This releases the striker 28 so that it is withdrawn from striker entry aperture 142 in the support casing 34 allowing the backrest 22 to be pivoted forwardly to its fold-down position shown in FIG. 1.

Although only one embodiment of the present invention has been illustrated and described, modifications and variations will readily come to mind of a person skilled in the art which modifications and variations do not fall outside the scope of the invention as defined hereinafter.

What is claimed is:

1. A vehicle body having an opening defined by a surrounding frame, a pivotal closure for the opening having a striker thereon, a latching and locking mechanism for the closure striker comprising:
   a face plate housing on the frame defining a striker entry aperture through which a striker is adapted to extend;
   a support bracket comprising an upper locking plate fixed to an inner portion of said face plate housing and a lower horizontally disposed latching plate, said latching plate having an admission slot therein for receiving said striker upon its passage through said entry aperture;
   a latching assembly having a pawl element and a ratchet element with each element mounted on said latching plate by a pivot shaft for swinging movement into and out of latched position;
   a boss formed on said face plate housing formed with an axial bore rotatably mounting a key-operated locking cylinder therein; said locking cylinder having a cam segment on its inner end rotatable with said locking cylinder between locked and unlocked positions;
   said face plate housing formed with a pair of spaced support trunnions extending inwardly therefrom, said trunnions having aligned holes receiving journal means supporting a tubular bushing portion of an operating lever between said trunnions for pivotal movement about a transverse axis,
   said operating lever comprising a handle portion and a prong portion interconnected with said bushing, said handle portion interconnected with said bushing by at least one support web, said handle portion extending through an access opening in said face plate housing and said prong portion extending toward said bracket latching plate;
   the improvement comprising:
   said support bracket upper locking plate formed with a transversly extending channel sized to capture a rectangular sectioned elongated lock bar therein adapted for transverse shifting travel in said channel, said lock bar formed with at least one notch intermediate its ends;
   spring means located between one end of said lock bar and said locking plate operative to bias the other end of said lock bar in a first direction contacting said locking cylinder cam segment, such that said lock bar notch is mis-aligned with said support web thereby positively blocking said bushing against rotation by said handle portion; and
   upon said locking cylinder being rotated to its unlocked mode said cam segment effective to shift said lock bar from its locked spring biased position to its unlocked position wherein the center of said lock bar notch is aligned with said support web wherein said operating lever bushing is free to rotate allowing said prong portion to trip said latching assembly out of its latched position so as to free said striker whereby said closure may be pivoted relative to said vehicle body opening.

2. The latching and locking mechanism as set forth in claim 1, wherein said handle portion is interconnected with said bushing by a pair of support webs, and said lock bar formed with a pair of notches intermediate its ends, said pair of notches having their centers spaced a predetermined distance equal to the spacing of said pair of support webs.

3. The latching and locking mechanism as set forth in claim 1, wherein said spring means is in the form of a compression coil spring.

4. A vehicle body having an opening defined by a surrounding frame, a pivotal closure for the opening having a striker thereon, a latching and locking mechanism for the closure striker comprising:
   a face plate housing on the frame defining a striker entry aperture through which a striker is adapted to extend;
   a support bracket comprising an upper locking plate fixed to an inner portion of said face plate housing and a lower horizontally disposed latching plate, said latching plate having an admission slot therein for receiving said striker upon its passage through said entry aperture;
   a latching assembly having a pawl element and a ratchet element with each element mounted on said latching plate by a pivot shaft for swinging movement into and out of latched position;
   a boss formed on said face plate housing formed with an axial bore rotatably mounting a key-operated locking cylinder therein; said locking cylinder having a cam segment on its inner end rotatable with said locking cylinder between locked and unlocked positions;
   said face plate housing formed with a pair of spaced support trunnions extending inwardly therefrom, said trunnions having aligned holes receiving journal means supporting a tubular bushing portion of an operating lever between said trunnions for pivotal movement about a transverse axis,
   said operating lever comprising a handle portion and a prong portion interconnected with said bushing, said handle portion interconnected to said bushing by at least one support web, said handle portion extending through an access opening in said face plate housing and said prong portion extending toward said toward said bracket latching plate;
   the improvement comprising:
   said support bracket upper locking plate formed with a plurality of fingers lanced from its free edge, said plurality of fingers consisting of a first set of fingers alternately spaced with a second set of fingers, said first set of fingers located in a first plane and said second set of fingers located in a second plane parallel to and offset from said first plane defining a transversely extending channel between said sets of fingers;

said channel sized to capture a rectangular sectioned elongated lock bar therebetween adapted for transverse shifting travel in said channel said lock bar, said lock bar formed with at least one notch intermediate its ends;

a compression coil spring located between one end of said lock bar and said locking plate operative to bias the other end said lock bar in a first direction contacting said locking cylinder cam segment, such that said lock bar notch is not aligned said support web thereby positively blocking said bushing against rotation by said handle portion; and upon said locking cylinder being rotated to its unlocked mode said cam segment effective to shift said lock bar from its locked spring biased position to its unlocked position wherein the center said lock bar notch is aligned with said support wherein said operating lever bushing is free to rotate allowing said program portion to trip said latching out of its latched position freeing said striker whereby said closure may be pivoted relative to said body opening.

5. The latching and locking mechanism as set forth in claim 4, wherein said handle portion interconnected with said bushing by a of support webs, and said lock bar formed with a of notches in its upper edge intermediate its ends, pair of notches having their centers spaced a predetermined distance equal to the spacing of said of support webs.

* * * * *